Dec. 24, 1940.   R. D. SHAW   2,225,717
TRACER FOR ELECTRICALLY CONTROLLED MACHINE TOOLS
Filed Oct. 20, 1938

INVENTOR
R. D. Shaw
BY Joseph K. Schofield
ATTORNEY

Patented Dec. 24, 1940

2,225,717

UNITED STATES PATENT OFFICE 2,225,717

TRACER FOR ELECTRICALLY CONTROLLED MACHINE TOOLS

Robert D. Shaw, Bloomfield, Conn., assignor to Niles-Bement-Pond Company, Hartford, Conn., a corporation of New Jersey Application October 20, 1938, Serial No. 236,059

8 Claims. (Cl. 90—62)

This invention relates to tracers and particularly to a tracer adapted to traverse the surface of a model on a copying milling machine or other type of metal cutting machine.

An object of the invention is to provide an improved form of tracer adapted to eliminate inaccuracies introduced by vibration of the movable parts of the tracer due to the action of the cutting tool upon the work being reproduced, and to compensate for variations in temperature of the members forming the tracer.

Another object of the invention is to provide a universal type tracer, movements of which in any direction will force a member in a direction to close the controlling circuits of the machine tool, the movable contact carrying member being mounted on a resiliently movable member actuated by variations in the capacity of a receptacle filled with a suitable fluid.

A feature of importance is that the contacts for opening and closing the control circuits are carried by a member mounted on the free end of a sylphon bellows or other type of receptacle, the interior of which is filled preferably with a liquid or fluid and which communicates with another receptacle, the capacity of which is varied and one end moved a slight amount by movement of the tracer in any direction.

With the above and other objects in view, the invention includes the features of construction and operation set forth in the following specification and illustrated in the accompanying drawing.

In the accompanying drawing annexed hereto and forming a part of this specification, I have shown the invention embodied in a tracer of the universal type supported at an intermediate point upon a ball and socket joint, but it will be understood that the invention can be otherwise embodied and that the drawing is not to be construed as defining or limiting the scope of the invention, the claims appended to this specification being relied upon for that purpose.

Figure 1:
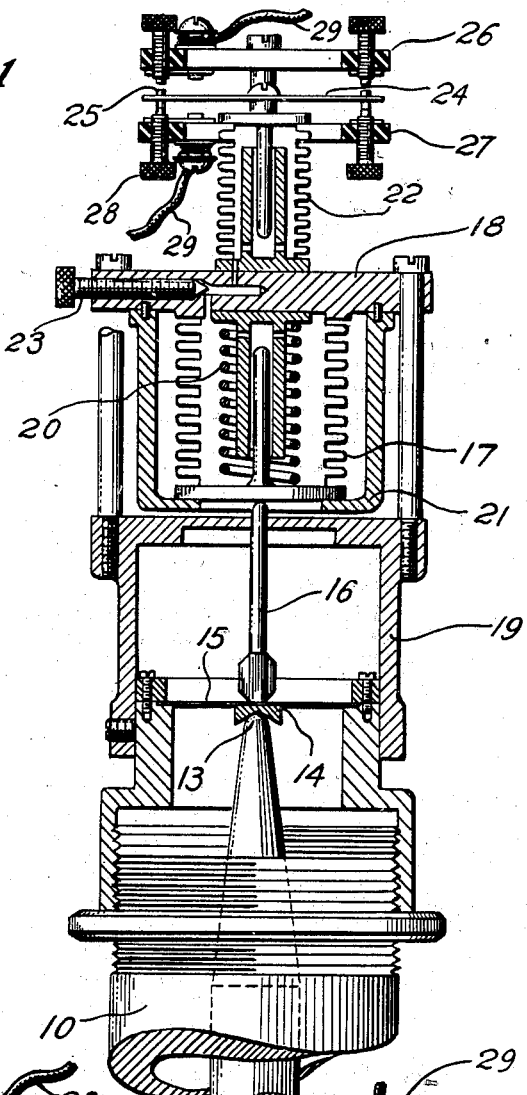
Figure 1 is a longitudinal view partly in section of a complete tracer made according to the present invention.
Figure 4:
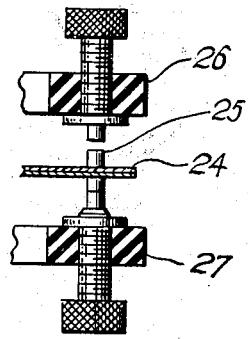
Fig. 4 is a fragmentary view in section of the movable contact member and adjacent parts.
Figure 2:
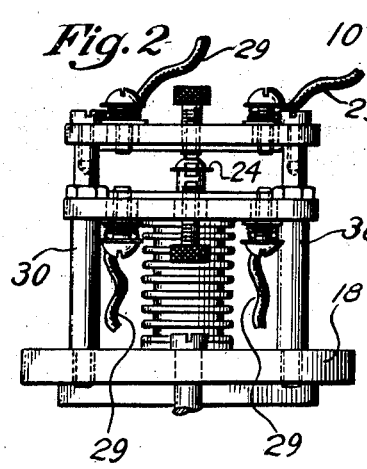
Fig. 2 is an outside view in elevation of one end of the tracer construction shown in Fig. 1.

In the above-mentioned drawing there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, an elongated casing; second, a tracer lever mounted for universal movement within the casing preferably upon a ball and socket joint, one end of which projects from the casing and is adapted to contact with the surface of a model being reproduced; third, a flexible diaphragm having a conically recessed member centrally mounted fixedly thereon and adapted to contact with the upper rounded end of the tracer lever; fourth, a compressible receptacle filled with liquid and supported rigidly upon the casing at one end, the opposite end of which bears against a member longitudinally moved by movements of the diaphragm; fifth, a second receptacle similar to the first receptacle but preferably of smaller size, the interior of which communicates with the interior of the first receptacle so that movements of one end of the first receptacle will effect movements of the opposite end of the second receptacle; sixth, a movable contact carrying member mounted on the free end of the second receptacle so that movements of this end of the receptacle and the contact carrying member will open and close control circuits of the machine tool on which the tracer is mounted.

The tracer forming the present invention is of the type shown in patent to Shaw 1,683,581, in Fig. 16, the contact closing members, however, being of a different type but operated by similar oscillatory and axial movements of the tracer lever. In the use of the machine shown and described in the above-mentioned patent, vibrations of the machine due to the action of the cutting tool cause vibrations within the tracer mechanism which are communicated to the contact closing member and therefore introduce inaccuracies in the work produced by tracers as shown in that patent. In the present invention the tracer lever is mounted for movement either axially rearwardly from the position shown or obliquely through a limited angle in any direction, any movement of the tracer lever serving to actuate a member in one direction. Any movement of the tracer lever from a central or neutral position serves to open one pair of contacts and if movement is sufficient will close an oppositely disposed pair of contacts.

Referring more in detail to the figures of the drawing, I provide a casing 10 in every way similar to the casing shown in the above-mentioned patent and within which is mounted at an intermediate point a contact lever 11. The bearing within which the lever 11 is mounted is of the ball and socket type. Movement of the lever, however, is permitted axially away from its seat as well as angularly about the socket as a center.

The extended lower end of the tracer lever 11 is provided with a model following end member 12 which normally, during operation of the machine, contacts with the surface of a model being reproduced. The upper or inner end of this lever 11 is provided with a hemispherical end 13 adapted in the central or neutral position of the tracer lever 11 to centrally engage within a conically recessed member 14 mounted centrally and fixedly upon a flexible diaphragm 15. The periphery of the diaphragm 15 is secured to the casing 10 in any preferred manner permitting slight vertical movements of the diaphragm 15 and recessed member 14 when the tracer 11 is moved axially upwardly or oscillated in any direction. In any direction of movement of the tracer lever 11 the movement of the recessed member 14 mounted centrally on the diaphragm 15 is in one direction, that is, upward. Mounted centrally and fixedly upon the opposite side of the diaphragm 15 and extending axially upward is a post 16, the upper end of which is in close contact with the lower end wall of a compressible receptacle 17, which, in the embodiment of the invention illustrated in the drawing, is of the bellows type. The upper end of this receptacle or bellows 17 is made fast to a plate 18 secured rigidly in position upon a member 19 secured to the casing 10 so that the free or lower end of the receptacle 17 may move upward slightly when the diaphragm 15 is deflected by movements of the tracer lever 11. Preferably a spring 20 is housed within the receptacle 17 normally forcing the bellows 17 toward its lowest position limited by a casing 21 surrounding the receptacle 17.

Mounted above the plate 18 on which the upper end wall of the receptacle 17 is secured is a second receptacle or bellows 22, the interior of which is in communication with the interior of the first receptacle, channels being provided within the plate 18 for this purpose. A needle valve 23 is inserted within the connection or conduit to limit the flow of liquid from one receptacle to the other. The lower end only of the receptacle 22 is secured to the plate 18 so that the upper end is free to move slightly up or down when liquid is admitted or withdrawn by movement of the lower end of receptacle 17.

Figure 3:
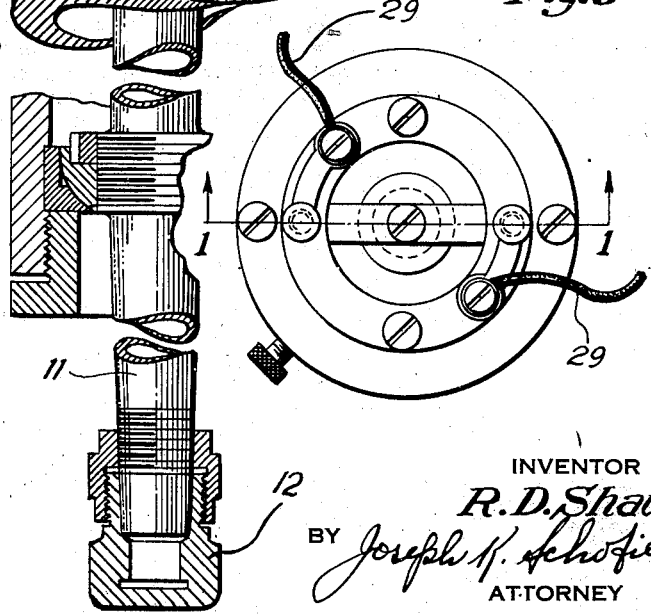
Fig. 3 is a plan view showing the contact closing end of the tracer.

On the upper or movable end of the second receptacle 22 is secured a metal plate 24 carrying contacts 25 adapted in the different positions of the receptacle 22 to be raised and lowered to engage adjustable contacts in plates 26 or 27 respectively above or below the member 24. Preferably the plates 26 and 27 are of insulating material and have the contacts mounted on adjusting screws 28. Screws 28 are electrically connected to leads 29 by suitable connections as shown in Fig. 3. To rigidly secure the plates 26 and 27 in position suitable posts 30 may be mounted in the plate 18.

It will be seen from the above description that movement of the tracer lever 11 in any direction will force the diaphragm 15 upward a very slight distance. This movement in turn will force the lower end of receptacle 17 upward to slightly reduce the capacity of that receptacle. This expels liquid from the receptacle 17 which flows into the second receptacle 22 past the needle valve 23. Fluid admitted to the second receptacle 22 in this manner will force the contact carrying bar or plate 24 upward to a position opening the lower contacts on member 27 and closing the contacts on plate 26 above the plate 24. When the tracer lever 11 returns to its central or neutral position, spring 20 forces the lower end of the receptacle 17 downward to increase the capacity of this receptacle and thus withdraw fluid from receptacle 22 and cause plate 24 to move downward to again close the lower contacts. These contacts are provided with cable attaching means so that the control circuits of the machine on which the tracer mechanism is mounted may be opened and closed by slight movements of the tracer lever 11. This circuit may be in every way similar to those shown and described in the above referred to patent.

In order to compensate for variations in temperature of the fluid employed in the receptacles 17 and 22 and the metal parts forming the tracer members, the contact carrying bar 24 may be made from a bi-metal strip having components of different co-efficients of expansion. With the contact screws 28 adjusted for any one temperature, variations of the temperature therefrom will cause a slight bending of the bar 24. With the tracer lever 10 in its central position the contacts on bar 24 will be midway between the adjustable contacts on plates 26 and 27 at all temperatures.

What I claim is:

1. A tracer for electrically controlled machine tools comprising in combination, a casing, a universally movable tracer lever mounted therein, a diaphragm flexed by movement of the tracer lever in any direction, contacts adjustable on said casing, and contacts movable with the flexing of said diaphragm and co-operating with said contacts on said casing to open and close circuits controlling the operation of said machine tool, one set of contacts being mounted on a temperature varied member to compensate for temperature variations of said casing and operative parts therefor.

2. A tracer for electrically controlled machine tools comprising in combination, a casing, a universally movable tracer lever mounted therein, a flexibly mounted member movable in one direction when said tracer is moved in any direction from its neutral position, a fluid-filled receptacle compressed by movement of said member, and contacts in the controlling circuits for said machine tool opened and closed by limited compression of said receptacle.

3. A tracer for electrically controlled machine tools comprising in combination, a casing, a universally movable tracer lever mounted therein, a flexibly mounted member movable in one direction when said tracer is moved in any direction from its neutral position, a fluid-filled receptacle the capacity of which is variable, means to vary said capacity by movement of said member, and contacts in the controlling circuits for said machine tool opened and closed by said variations in capacity of said receptacle.

4. A tracer for electrically controlled machine tools comprising in combination, a casing, a universally movable tracer lever mounted therein, a flexibly mounted member movable axially when said tracer is moved in any direction, a fluid-filled receptacle the capacity of which is varied by movement of said member, and contacts in circuits for controlling said machine tool opened and closed by limited variations in capacity of said receptacle.

5. A tracer for electrically controlled machine tools comprising in combination, a casing, a universally mounted tracer lever mounted therein, a flexibly mounted member movable axially when said tracer is moved in any direction from its neutral position, a fluid-filled receptacle the capacity of which is varied by movement of said member, a second receptacle communicating with said first mentioned receptacle, means to restrict the flow from one receptacle to the other, whereby compression of said first receptacle will effect expansion of said second receptacle, and contacts in circuits for controlling said machine tool opened and closed by expansive movement of said second receptacle.

6. A tracer for electrically controlled machine tools comprising in combination, a casing, a universally mounted tracer lever mounted therein, a flexibly mounted member movable axially when said tracer is moved in any direction from its neutral position, a fluid-filled receptacle compressed by movement of said member, a second receptacle communicating with said first mentioned receptacle and differing in size therefrom, whereby compression of said first receptacle will effect expansion of said second receptacle, and contacts in circuits for controlling said machine tool opened and closed by expansive movement of said second receptacle.

7. A tracer for electrically controlled machine tools comprising in combination, a casing, a universally mounted tracer lever mounted therein, a flexibly mounted member movable axially when said tracer is moved in any direction from its neutral position, a fluid-filled receptacle compressed by movement of said member, a second receptacle communicating with said first mentioned receptacle and differing in size therefrom, means to restrict the flow from one receptacle to the other, whereby compression of said first receptacle will effect expansion of said second receptacle, and contacts in circuits for controlling said machine tool opened and closed by expansive movement of said second receptacle.

8. A tracer for electrically controlled machine tools comprising in combination, a casing, a universally mounted tracer lever mounted therein, a flexibly mounted member movable axially in one direction when said tracer is moved in any direction from its neutral position, a liquid-filled receptacle compressed by movement of said member, a second receptacle communicating with said first mentioned receptacle and differing in size therefrom, whereby compression of said first receptacle will effect expansion of said second receptacle, a member carried and moved by expansion of said second receptacle, and contacts on said movable member for controlling circuits for said machine tool opened and closed by expansive movement of said second receptacle.

ROBERT D. SHAW.